Jan. 5, 1971  M. C. FETTER  3,552,928
WHOLE BLOOD SEPARATION MEANS AND TEST SYSTEM USING SAME
Filed July 19, 1967

DIRECTION OF FLUID FLOW

DIRECTION OF FLUID FLOW

DIRECTION OF FLUID FLOW

DIRECTION OF FLUID FLOW

DIRECTION OF FLUID FLOW

INVENTOR
MARION C. FETTER
BY Harry J. Stephenson
ATTORNEY

United States Patent Office 3,552,928
Patented Jan. 5, 1971

3,552,928
WHOLE BLOOD SEPARATION MEANS AND
TEST SYSTEM USING SAME
Marion Cook Fetter, Elkhart, Ind., assignor to Miles Laboratories, Inc., Elkhart, Ind., a corporation of Indiana
Filed July 19, 1967, Ser. No. 654,573
Int. Cl. G01n 31/06, 31/22, 33/16
U.S. Cl. 23—253                6 Claims

ABSTRACT OF THE DISCLOSURE

Means for separating whole blood into a substantially colorless fluid and the red cell components or residue, said means comprising contacting the whole blood with certain amino acids such as glycine, alanine and/or derivatives thereof. In a preferable use of this means to effect a test device and method for detecting soluble constituents in whole blood, a matrix containing the amino acid or derivative thereof is positioned adjacent to a test reagent specifically reactable with and giving a detectable response to said soluble constituent, the whole blood first being contacted with the amino acid and the colorless fluid thus obtained then contacted with the test reagent.

---

Figure 1:

Recently numerous simple test devices have been developed for the rapid analysis of body fluids for various constituents which, if found to be present in excess of a predetermined amount, indicate the probability of a pathological condition. Such tests include, inter alia, means for detecting glucose and other sugars such as galactose in urine and blood, protein in urine, ketone bodies, urea nitrogen, uric acid, phenylalanine and certain enzymes, only to mention a few. Of the many tests and methods devised, the detection of various soluble constituents in whole blood has been found to be particularly difficult. The reason for this difficulty resides in the fact that the known rapid and simple test devices almost invariably utilize chromogenic or other visual responses to indicate the presence or absence of the constituents being detected and the presence of the red coloration in whole blood usually seriously interferes with this analysis. Of the other simplified test procedures and compositions which employ responses other than chromogenic, the presence of whole blood likewise seriously interferes with the observation or measurement of the positive response. These other methods depend upon such chemical phenomena as precipitation and enzyme catalyzed reactions, gas formation, coagulation, agglutination, formation of ultra-violet and infra-red absorbing molecules and fluorescence, only to mention a few.

Various means have been proposed for separating and removing the highly colored red cell components from whole blood prior to, for example, the analysis thereof. One of the simpler of these methods involves the use of a bibulous carrier member having a portion which is impregnated with a test reagent composition and coated with a semipermeable membrane which effectively acts as a means for screening out large molecules such as hemoglobin, but permits the passage of smaller molecules and ions in solution. A clear fluid containing the constituent being sought then enters the test reagent impregnated portion of the carrier, causing a chromogenic reaction in the case of a positive test. The coated strip portion is then rinsed with water to remove the excess blood and hemoglobin from the surface of the membrane and permit observation of the color change produced.

This method, however, is rather cumbersome and laborious and requires an extra manipulative step, i.e., rinsing with water. In mass screening programs this extra step can amount to a considerable loss in time and efficiency. Moreover, the membrane can screen out larger molecules in solution which would preclude these molecules from reaching the test reagent and hence render the method inoperative as to such molecules.

It is therefore an object of the present invention to provide a simple means for separating the highly colored red cell components or red coloration from whole blood. It is another object of the present invention to provide a simple and rapid test device for detecting certain soluble constituents in whole blood. It is still another object to provide a unitary test device whereby whole blood may be analyzed for certain soluble constituents using a single manipulative step. It is a further object to provide a means for analyzing blood for soluble molecular constituents which would be removed by a membrane separating means.

It has now been found that certain chemical compounds are effective in causing a separation of the highly colored red cell components of whole blood from the fluid in which these red cell components are found. The exact chemical reaction involved in this phenomenon is not yet known. The result, however, is a highly effective means for removing this colored component from the whole blood, thus allowing a facile determination of constituents in the remaining fluid.

Specifically, it has been found that if whole blood is caused to contact certain chemical compounds, the resulting blood fluid after separation from the residue is usually slightly straw colored or is imbued with only a slight color. This slightly colored fluid may then be contacted with a test reagent which specifically reacts with a particular constituent to be detected in the blood fluid. Specific blood constituents which have been found amenable to the concepts disclosed in the present invention, include, inter alia, glucose, galactose, urea, uric acid, phenylalanine and various enzymes.

As used hereinafter, the following terms are defined as follows: detection is defined as the quantitative determination of the particular constituent being analyzed as well as the qualitative detection thereof; separating reagent is defined as a chemical or mixture of chemicals which effect a separation of the highly colored red cell components of blood from the remaining fluid; test reagent is defined as a chemical or mixture of chemicals which exhibit an observable or detectable reaction when contacted with the substance being detected; matrix is defined as any physical means whereby the test reagent and/or separating reagent is confined and positioned so that the blood may make contact therewith; whole blood is defined as blood containing all the originally present in vivo constituents and may include anticoagulants and other adjuvants.

Although the separation means of the present invention has utility in many areas of blood technology as noted hereinabove, it may be and preferably is utilized in conjunction with a test composition which is specifically reactable with a soluble constituent contained in the blood fluid and an analysis or estimation of this soluble constituent is desired. In such a system, the whole blood may simply be initially contacted with the separative reagent and then, after removal of the residue, the remaining fluid contacted with the test reagent. However, the test reagent and separating reagent are preferably incorporated with a matrix to effect a single entity test device. Since the function of the matrix is merely to suspend and contain the reagents, whether the function of the reagent be to separate the red coloration from the blood sample or to detect the constituent being sought, the composition or physical makeup of the matrix may comprise many forms, such as cellulose fibers as found in paper, synthetic fibers, wood sticks, cloth, sponge materials, argilaceous substances, conduits, and so forth. The only requirement of the matrix is that it suspend and contain the reagents. However, in utilizing the separating reagent, it is necessary that the matrix allow the colorless or only slightly colored resultant fluid to pass through or at least to flow therefrom in order that it may contact the test reagent for analysis. The preferable matrix material of the present invention is bibulous filter paper.

The test system of the present invention may comprise a single matrix which contains both the separating reagent or reagents and the test reagent in such a way that the whole blood first contacts the separating reagent and the substantially colorless fluid thereby obtained then contacts the test reagent. In employing the single matrix test system the separating reagent must be compatible with the test reagent, both from a reaction standpoint, and from a chemical stability standpoint, and the matrix must be of such design that when the blood sample reaches the area of the device where the positive or negative response is read, the fluid must be substantially free of the red coloration. In such an embodiment, a single bibulous paper strip is first impregnated through and through with the test reagent and subsequently the surface of the matrix coated or impregnated with the separating reagent. In such a test device the whole blood is first contacted with the separating reagent and the test response observed in an area not initially contacted with the blood and to which the substantially colorless fluid has migrated. For example, blood is applied to a side of bibulous paper strip which is coated with the separating reagent and the response observed on the reverse side.

Although a single matrix test device may be constructed as indicated hereinabove, test systems of the present invention are preferably fabricated so that the separating reagent is contained in or on a first matrix and the test reagent in or on a second matrix. In so preparing the test device, there is no danger from chemical incompatibility or instability and only a minimal amount of separating reagent is carried into the test reagent area of the test device.

In regard to the positioning of the matrices when a dual matrix system is utilized, it is to be noted that the test device utilizing these separating and analyzing means must be positioned so that whole blood must initially contact the first matrix containing the separating reagent and the fluid must flow or be conducted through or from this first matrix to the second matrix containing the test reagent. In the simplest and preferred form of the present invention, the matrix material is cellulose filter paper which is impregnated in separate areas thereof with the separating reagent and test reagent. This system may involve a strip of cellulose paper, an end portion of which is impregnated with the separating reagent and immediately inwardly of said impregnated end portion an adjacent or contiguous area of said strip is impregnated with the test reagent. It should be noted that although the term dual matrix is used, the matrix itself may be an integral unit.

Another embodiment of the test device of the present invention involves the positioning of the first and second matrices in laminate relationship, i.e., the first matrix comprising a strip of filter paper impregnated with the separating reagent is overlayed or superimposed on a second strip of filter paper impregnated with the test reagent.

Figure 2:
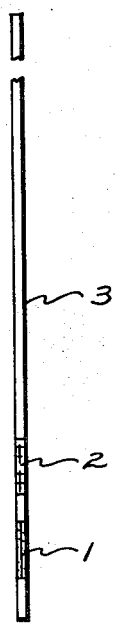

Specifically, the positioning of the various matrices and reagents may be better understood by reference to the drawings wherein:

FIG. 1 shows a side view of a strip 3 of carrier material forming a continuous matrix, a portion 1 near the end of which is impregnated with the separating reagent and an adjacent portion 2 inwardly thereof is impregnated with test reagent. FIG. 2 is an edge view of this same test strip.

In utilizing this device, the end portion of strip 3 containing the reagents is immersed in the blood to be analyzed to a depth preferably sufficient to cover the major portion of the area 1 but not to a depth to completely cover said area. The colored portions of the blood are retained in the area 1 of strip 3 and a substantially colorless fluid then migrates along the strip into contact with the test reagent in area 2, giving a detectable response if the constituent being tested for is present in the blood fluid.

Figure 3:
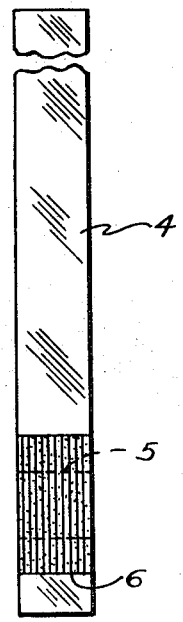
Figure 4:
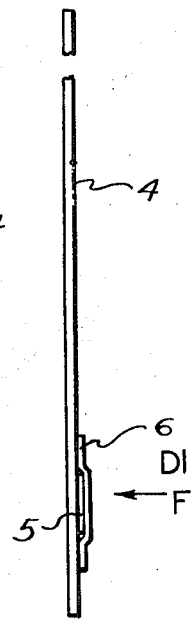

FIG. 3 is a side view of a strip 4 of transparent or translucent material having directly affixed thereto a matrix 5 shown in dotted lines and impregnated with a test reagent. FIG. 4 is an edge view of this same test strip. Immediately overlaying the matrix 5 is a second matrix 6 impregnated with the separating reagent.

In using this device blood to be tested is applied to the surface of the separating reagent matrix 6, and the colored portions of the blood are retained in said matrix 6, whereas the colorless portion thereof migrates through to the test reagent matrix 5. The color response if any, in matrix 5 is observed through the transparent or translucent material 4.

Figure 5:
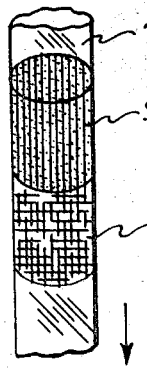

FIG. 5 shows a conduit of transparent or translucent material, for example of plastic, which forms an outer matrix within which a test reagent 8 and separating reagent 9 are positioned either with or without an additional internal matrix. In use of this device, blood is pumped or allowed to gravity flow through the device from the separating reagent 9 which retains the colored portions thereof, to the test reagent 8. The color response, if any, is detected in the test reagent area 8.

Figure 6:
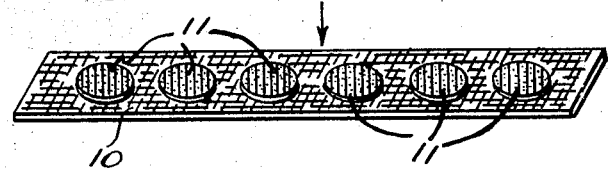

FIG. 6 shows a strip of carrier material or first matrix 10 into or upon which a test reagent is incorporated. Discs of a matrix 11 into which the separating reagent is impregnated are laid upon the matrix 10 containing the test reagent. In use of this device blood to be tested is applied directly to a matrix 11. The colored portions of the blood are retained in the matrix 11 and the colorless portion thereof flows into the matrix 10. Removal of the matrix 11 to which blood was applied, permits observation of any color reaction occurring in the matrix 10 containing the test reagent.

Figure 7:
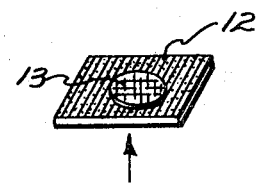

FIG. 7 shows a form of the invention similar to that shown in FIG. 6 but used differently. In FIG. 7 a separating reagent and a test reagent are separately impregnated into bibulous members 12 and 13, and such members joined together in laminate relation as shown. A drop of blood, not shown, is placed upon a suitable surface and the laminate unit is then placed upon the blood drop with separating matrix 12 down. The colored portions of the blood drop are retained in matrix 12, and the clear fluid flows upward and into the test reagent matrix 13 to cause a detectable color response in the latter matrix in the case of a positive test.

Figure 8:
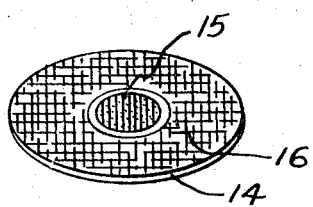

FIG. 8 shows a circular planar bibulous matrix member 14 having a central portion 15 thereof impregnated with a separating reagent. An annular portion 16 of the member 14 surrounding the portion 15 is impregnated with a test reagent. Blood to be tested is applied to the central portion 15 of the device. The colored portions of the blood are retained in the area 15 and the colorless portions thereof migrate radially outward into the test reagent area 16 to cause a detectable color response therein in the case of a positive test.

Referring now to the separating reagent which effects the removal of the highly colored red cell components from full blood, it has been found that amino acids and derivatives thereof, in varying degrees, effect such a separation. As used hereinafter the term amino acid is defined to include both amino acids and certain derivatives thereof such as amides and salts. The salts include such compounds as the hydrochloride and the alkali-metal salts of amino acids. These derivatives must, however, meet the requirements listed hereinbelow for the separating reagents used in the present invention.

The amino acids of the present invention must be water-soluble and from a practical standpoint, must be non-volatile and should not decompose to any appreciable extent under the conditions of preparing and utilizing the test device. Moreover, since at least a portion of the amino acid is solubilized and carried into the test reagent part of the device, the salt therefore must be compatable with the test reagent. However, the situation where the amino acid is carried into the test reagent may be advantageously utilized where the amino acid thus becomes an integral part of the test reagent system. This concept will be more fully elucidated hereinafter. For the purposes of the present invention, the term water-soluble amino acid is defined as an amino acid or derivative thereof having a solubility in distilled water, without the aid of solubilizers, of at least 0.5 g. per 100 ml. at 20° C. Among the many amino acids which are operable in the present method are:

| | |
|---|---|
| 1-alanine | Isoleucine |
| Aspartic acid | Lycine |
| Arginine | Methionine |
| Glycyl, glycyl, glycylglycine | Phenylalanine sodium salt |
| Glycine | Proline |
| Glutamic acid | Serine |
| Histidine | Threonine |
| Hydroxyl-1-proline | Valine |

In preparing the test devices of the present invention and particularly in regard to the separating reagent, usually the amount of reagent employed will depend on the particular chemical selected to perform the function of removing the red coloration from the whole blood. Since it is difficult to assess the amount of a particular amino acid which is impregnated into a carrier member, this facet of the present disclosure will be defined in terms of the concentration of separating reagent in the solution used to impregnate or coat the carrier member. Solutions of amino acids having a concentration of about from 2% to about 50% by weight may be used. However, for reasons of economy and efficiency, an impregnating solution of about from 5% to 10% is preferable. Solvents other than water may be used depending on the separating reagent solubility characteristics.

It has also been found that the amino acid impregnating solution must be alkaline or only moderately acid. In this regard, impregnating solutions of amino acids having a pH of less than about 2.0 have been found to result in a test device or separating means which is ineffective in removing the red coloration from whole blood. Thus, solutions of amino acids having a pH of about 2.0 to 11.0 are used in preparing the separating matrices of the present invention.

In preparing the above noted solutions, if the solubility characteristics of a particular amino acid are such that the desired concentration cannot normally be achieved, then the aqueous solvent may be heated to an elevated temperature to effect solubility of the amino acid or the amino acid may be converted to a soluble salt such as, for example, the sodium salt or the hydrochloride. In elevating the temperature of the solvent, the heat stability limits of the amino acid must be observed and the matrix impregnated with the heated solution. Additionally, when the salt form of the amino acid is used, the impregnating solution pH limits must be observed.

Moreover, it has been found that the amino acids of the present invention are effective in removing the red cell constituents from whole blood even though anti-coagulants have been added to the blood. Specifically the whole blood may contain anticoagulants such as heparin or ethylenediaminetetraacetic acid (EDTA) and yet the anticoagulated whole blood remains amenable to the separation means disclosed herein.

As noted hereinabove, the preferable matrix material of the present invention is bibulous filter paper. Such paper has been found to be extremely satisfactory for use as a matrix material for suspending and positioning both the separating reagent and the test reagent. Filter paper has been found to have particular utility in retaining the separating reagent, and in this regard the type of filter paper used has been found to influence the effectiveness of the separation process. As known to those skilled in the art of basic chemistry, filter paper can be obtained in variety of thicknesses and porosities. Since use of the device requires the separating reagent to at least momentarily contact the whole blood and the substantially colorless fluid must be allowed to emerge therefrom, both of the above factors influence the efficiency of the system. When coarse porosity paper is used, the thickness thereof must be sufficient to allow the minimal contact time between the whole blood and the separating reagent. The reverse of this, of course, is likewise true; and when a fine porosity paper is utilized, a relatively thin sheet may be employed. The proper balance between these factors, as well as a judicious selection of the concentration of separating reagent in the impregnating solution is well within the experimental techniques used by those skilled in the art of preparing test devices such as those described in the present specification.

An additional novel and advantageous feature of the present invention resides in the fact that in certain instances the separating reagent may be utilized as an integral part of the test reagent system and thus performs a dual function in the test device. For example, in the nitroprusside test for ketone bodies, the nitroprusside for stability purposes must be retained in an acid environment. In such a method, however, the reaction is normally carried out in an alkaline medium. In this method it is therefore common practice to employ an alkaline buffer which includes a water-soluble amino acid and retain this mixture separate from the nitroprusside. In a test device as described in the present disclosure, the amino acid and buffer may ideally be retained in a first matrix and the nitroprusside in a second matrix in contiguous position to the amino acid matrix. When blood is applied to the first matrix, the substantially colorless fluid emerging therefrom carries the soluble amino acid and buffer into the test reagent matrix and the test functions in the normal manner. In such a situation, the concentration of amino acid must be adjusted to meet the needs of both the separating reagent and the test reagent.

In a similar situation, when the test reagent contains amino acids which are effective as separating reagents, then the concentration of separating reagent utilized may be correspondingly decreased. From the above, it is apparent that the present invention allows for considerable latitude in selecting reagents and the concentration and placement thereof. This manipulation of the test device is well within the scope of one skilled in the art with the present disclosure at his disposal.

The mode of use of the present invention varies with the particular embodiment employed. Generaly, in utilizing the single matrix test strip system in which the reagents are present, a drop or two of blood is placed on the face of the impregnated matrix held in a horizontal position and allowed to penetrate into the body of the test device. After the colorless fluid migrates down through the matrix, the device is turned over and any color response is observed on the side opposite the site of application. If penetration is not complete, more blood is added to the previous site of application. This type of device may also be partially immersed into the whole blood to be tested and withdrawn. Some of the blood fluid will migrate away from the immersed area and be decolorized by the separating reagent. Any color response is observed in this area.

In utilizing the two matrix test device, the same procedures as above apply except that the blood is always applied to the matrix containing the separating reagent and any color response is observed in the matrix containing the test reagent to which the colorless fluid has migrated.

The mode of use and the method of preparing the present test device will be illustrated by the following examples. These examples will also serve to illustrate the broad scope of the present invention as well as some of the specific concepts disclosed herein. The examples are not, however, to be considered as placing any limitation on the full scope of the present invention.

The test devices were placed on a level surface with the separating reagent impregnated paper facing upward. A drop of blood containing 150 mg. percent glucose was then placed directly in the center of the separating reagent paper. Two minutes were allowed to lapse (except where noted in Table I) and the strip was turned over to expose the test reagent area under the clear plastic strip. The color reaction observed is noted in the column designated "Reaction" in Table I.

TABLE I

| | | Impregnating solution | | S&S filter paper No. 2316 separating reagent matrix | | S&S filter paper No. 507C separating reagent matrix | |
|---|---|---|---|---|---|---|---|
| Separating reagent | | pH | Conc., percent | Separation | Laminated strip reaction | Separation | Laminated strip reaction |
| Example No.: | | | | | | | |
| 1 | l-alanine | 5.5 | 5.0 | + | D. green | + | Red green. |
| 2 | Aspartic acid | 11.0 | 3.6 | + | Pink tan | + | Pink tan. |
| 3 | Arginine | 6.0 | 4.8 | + | D. green | + | Red green. |
| 4 | Glycyl, glycyl, glycylglycine | 6.5 | 4.5 | + | D. green plus red blue | + | D. red-brown. |
| 5 | Glycine | 5.6 | 5.0 | + | D. green | + | Do. |
| 6 | Glutamic acid | 9.3 | 3.8 | + | Blue | + | Blue. |
| 7 | Histidine | 5.8 | 4.9 | + | D. green-blue | + | D. red-blue. |
| 8 | Hydroxyl-l-proline | 9.3 | 5.0 | + | Tan and red | + | Red. |
| 9 | Isoleucine | 8.4 | 4.2 | + | Green | + | L. green. |
| 10 | Lycine | 5.7 | 4.9 | + | D. blue | + | L. green and red-brown. |
| 11 | Methionine | 8.6 | 4.4 | + | Tan | + | Tan. |
| 12 | Phenylalanine sodium salt | 11.0 | 3.1 | + | | + | Red-brown. |
| 13 | Proline | 7.8 | 4.9 | + | D. green | + | Do. |
| 14 | Serine | 8.5 | 4.4 | + | L. green | + | D. blue. |
| 15 | Threonine | 5.5 | 4.9 | + | D. blue | + | Do. |
| 16 | Valine | 8.5 | 4.8 | + | Green | 0 | D. green. |

EXAMPLES 1–16

In the following examples, solutions of the amino acids listed in Table I were prepared by dissolving the indicated quantity of the amino acid in distilled water. Pieces of two types of filter paper as indicated in Table I were immersed into the solutions, removed, allowed to drain and dried in an oven at 40° C. A preliminary screening was carried out by placing a drop of EDTA (ethylenediaminetetraacetic acid), anticoagulated whole blood on the impregnated filter papers and observing the zone immediately beyond the area of the drop of blood for a colorless fluid which migrates away from the area of application. The results are shown in Table I.

Laminated strip test devices were then prepared as shown in FIG. 3 of the accompanying drawings. The test reagent impregnated portion 2 of the strip was impregnated with a glucose sensitive composition comprising the dried solids of two impregnating solutions, the first of which was prepared by adding, with agitation 1.3 g. of glucose oxidase, 0.012 g. of peroxidase, 0.269 g. of potassium dihydrogen phosphate, 0.004 g. of sodium monohydrogen phosphate and 10.0 ml. of acetone to a small flask containing about 50 ml. of distilled water. The total volume of the solution was brought to 100 ml. by the addition of distilled water. A second solution was prepared by dissolving 0.42 g. of ortho-tolidine in a small quantity of acetone and bringing the total volume of the solution to 100 ml. with acetone. Pieces of Schleicher and Schuell filter paper No. 2316 and No. 507C were dipped into the first solution, allowed to drain and dried at 40° C. These same pieces of filter paper were dipped into the second solution, allowed to drain and dried at room temperature. The impregnated portions of the paper making up the test reagent matrix, upon drying, was a light yellow color.

The paper impregnated with the test reagent was then cut into small squares about ½ cm. x ½ cm. one each of which was affixed to an end portion of a strip of clear flexible polyvinyl chloride film about 8 cm. x ½ cm. The papers impregnated with the separating reagent as shown in Table I were similarily cut into small rectangles about ½ cm. x 1 cm. and placed directly over the test reagent paper squares previously affixed to the clear strips. The overlapping ends of the separating reagent paper were also affixed to the clear strip as shown in FIG. 2. The test devices thus prepared made up the laminated strips used as indicated in Table I.

What is claimed is:

1. A test device for detecting soluble constituents in whole blood which comprises a first matrix having incorporated therewith a test reagent specifically reactable with said constituents, and adjacent to said first matrix a second matrix containing a separating quantity of a reagent comprising a water-soluble, nonvolatile amino acid.

2. A test device as in claim 1 wherein the first matrix and the second matrix are a bibulous material.

3. A test device as in claim 1 wherein the first matrix and the second matrix are in contiguous relationship.

4. A test device as in claim 1 wherein the first matrix and the second matrix are in laminate relationship.

5. A test device as in claim 1 wherein the second matrix is incorporated with the dried solids remaining from a solution containing about from 2% to 50% by weight of said separating reagent.

6. A test device as in claim 5 wherein the solution contains about from 5% to 10% by weight of said separating reagent.

References Cited

UNITED STATES PATENTS

| 2,577,978 | 12/1951 | Nicholls et al. | 23—230(B10)X |
| 2,990,253 | 6/1961 | Smeby | 23—230(B10)X |
| 3,011,874 | 12/1961 | Deutsch | 23—230(B10)X |
| 3,016,292 | 1/1962 | Baver et al. | 23—230(B10)X |
| 3,069,330 | 12/1962 | Babson | 195—103.5 |
| 3,123,443 | 3/1964 | Smeby | 23—230(B10)X |
| 3,235,337 | 2/1966 | Artis | 23—253(TP) |
| 3,266,868 | 8/1966 | Harvill | 23—253(TP) |
| 3,341,427 | 9/1967 | Evans et al. | 195—103.5 |
| 3,362,886 | 1/1968 | Rupe | 23—230(B10)X |
| 2,893,844 | 7/1959 | Cook | 252—408X |

FOREIGN PATENTS

| 1,037,155 | 7/1966 | Great Britain | 23—253(TP) |

MORRIS O. WOLK, Primary Examiner

B. S. RICHMAN, Assistant Examiner

U.S. Cl. X.R.

23—230; 195—103.5; 210—25; 252—408